J. WEBSTER.
Cake-Cutters.

No. 139,217.

Patented May 20, 1873.

WITNESSES.
John P. McElroy
C. A. Pease

INVENTOR.
J. Webster
pr. Brown Brothers
Attorneys.

UNITED STATES PATENT OFFICE.

JEREMIAH WEBSTER, OF CHARLESTOWN, MASSACHUSETTS.

IMPROVEMENT IN CAKE-CUTTERS.

Specification forming part of Letters Patent No. 139,217, dated May 20, 1873; application filed March 26, 1873.

*To all whom it may concern:*

Be it known that I, JEREMIAH WEBSTER, of Charlestown, in the county of Middlesex and State of Massachusetts, have invented a certain new and useful Improvement in the Cutting of Snaps or other Cakes, and in the Cutters and Tables therefor; and that the following is a full, clear, and exact description of the same, reference being had to the accompanying plate of drawing.

The purpose of this invention is to decrease the labor of cutting snaps or other cakes from a sheet of dough, and of transferring them to pans or plates to be placed in the baking-oven, and also to insure the rolling of the dough into a sheet of even thickness throughout; and the invention consists of a novel construction of a table or bed on which to roll the dough into sheets, &c., as fully hereinafter described.

Figure 1:
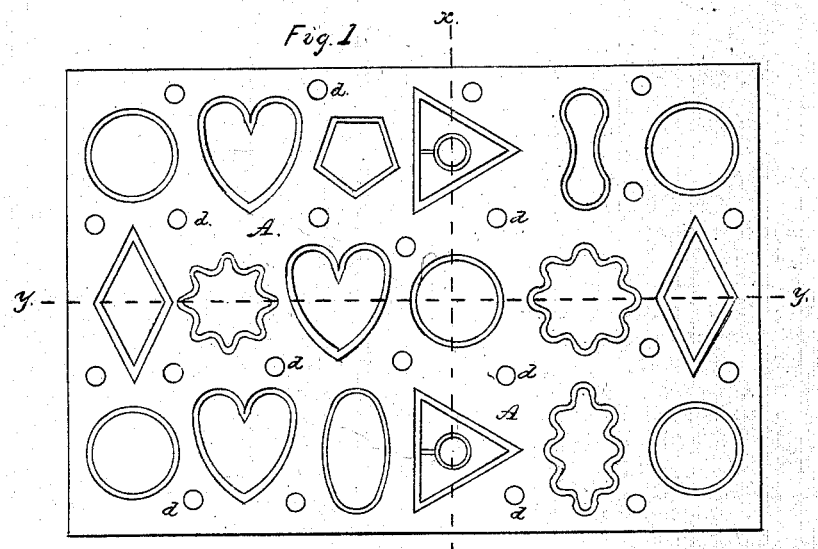
Figure 2:
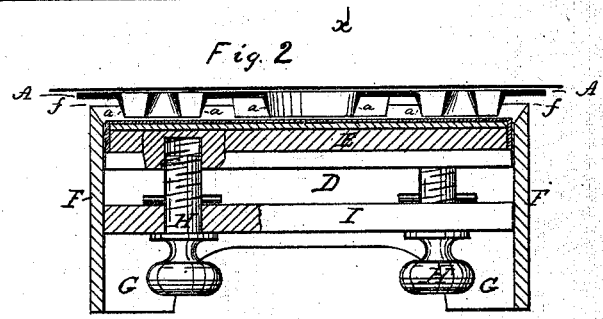
Figure 3:
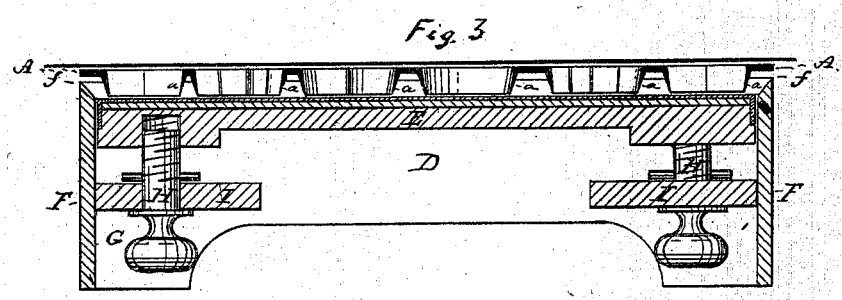

In the accompanying plate of drawing my invention is illustrated, Figure 1 being a face view of the cutting-plate; Fig. 2, a cross section in plane of line $x\ x$, Fig. 1, showing the cutting-plate as upon the table or bed whereon the dough is rolled, this table being also in vertical cross-section, and the cutting-plate covered by a baking pan or plate; and Fig. 3, cross-section in plane of line $y\ y$.

A in the drawing represents a cake-cutting plate, made, by preference, of metal, and provided with cutting-flanges $a$, projecting from one face or side. The cutting-flanges $a$ are shown in various outlines or figures, (see Fig. 1,) as, for instance, round, oval, heart-shaped, triangular, and within such figures, made by the cutting-flanges $a$, the plate is open, corresponding to the interior periphery of the figure, which interior periphery is larger at the surface $c$ of the plate than at the cutting-edge of the flanges $a$, tapering between such planes; $d$, small holes through thickness of plate A, at various points thereof, as shown; D, a table or bed on which to roll dough. This table or bed is constructed of a platen, E, having legs G and thumb-screws H under the platen E, and applied to the cross-pieces I of the frame F, and to the under side of platen E, as shown, so that turning them in the one by direction the platen E can be raised, and in the other direction lowered, enabling thereby the platen E to be set at any height with reference to the upper edge $f$ of the frame F, according as may be desired in the use of the table to have the dough rolled thereon of a greater or lesser thickness, which, as is obvious, will be regulated by the distance which the platen E is below the upper edge of the frame.

Having rolled the dough, the cutting-plate is then placed on it, as shown, cutting the sheet into cakes corresponding in form to the outlines of the cutting-edges, when place the baking pan or plate on the cutting-plate, and together, the three parts as one, overturn the whole and raise the table and cake-cutter, which will leave the cakes upon the baking-pan, they escaping from the cutting-openings in consequence of their inner taper. The holes $d$ allow the air to freely escape as the cutting-plate A is forced down to cut the sheet of dough, and prevent an air-cushion being formed between the dough and under side of cutting-plate, and also facilitate the detachment from the cutting-plate of those parts of the dough-sheet between the cakes cut out, as described. The platen-top has a rubber surface, covered with cloth, the purpose being to prevent the dulling of the cutting-flanges to the cutting-plate A; but this covering of rubber is not otherwise essential.

Having thus described my invention, what I claim, and desire to secure by Letters Patent, is—

The combination with the cutting-plate of the table D, composed of a platen, E, arranged within a frame, to be adjusted substantially as described, for the purpose specified.

The above specification of my invention signed by me this 17th day of February, A. D. 1873.

J. WEBSTER.

Witnesses:
EDWIN W. BROWN,
JOHN P. MCELROY.